Dec. 11, 1928.  F. M. VOGAN  1,695,129
SPRING SUPPORT
Filed June 26, 1924   2 Sheets-Sheet 1
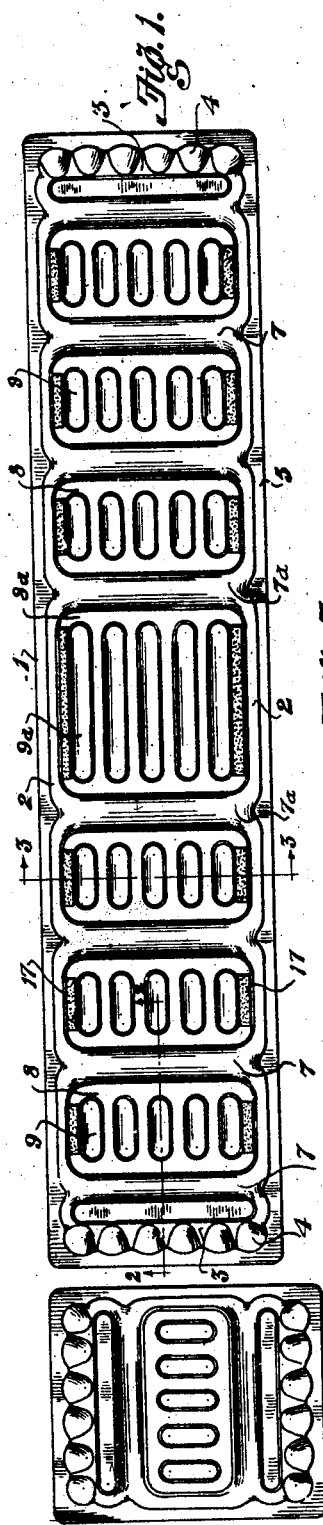
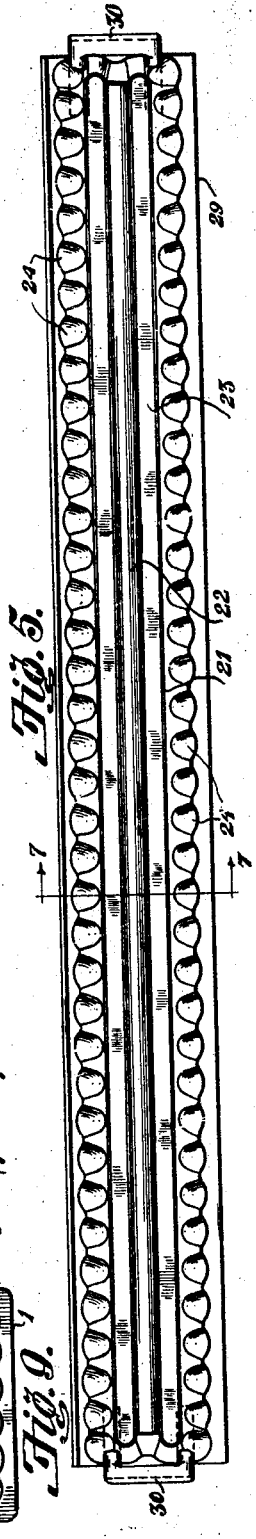
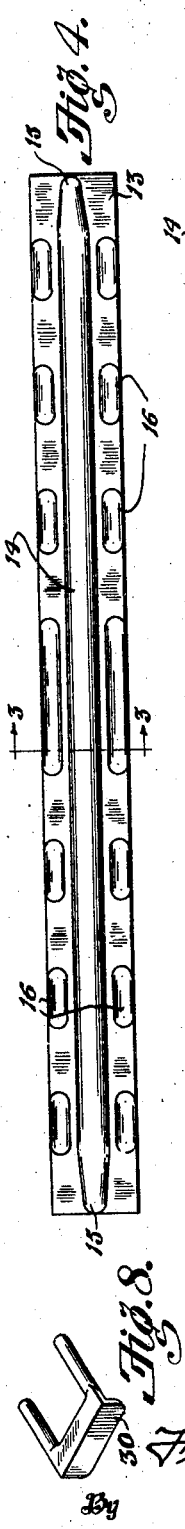
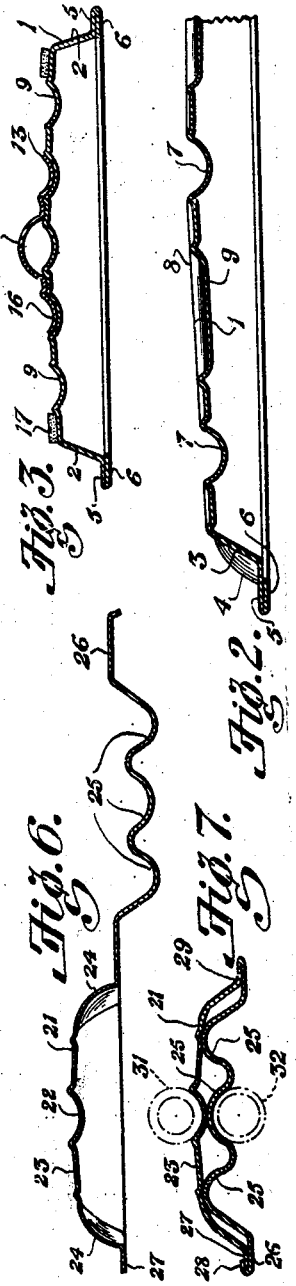
Inventor
F. M. Vogan.
By Freast and Bond
Attorneys Dec. 11, 1928.

F. M. VOGAN 1,695,129

SPRING SUPPORT

Filed June 26, 1924   2 Sheets-Sheet 2

Inventor
F. M. Vogan
By Frease and Bush
Attorneys

Patented Dec. 11, 1928.

1,695,129

UNITED STATES PATENT OFFICE.

FRANK M. VOGAN, OF CANTON, OHIO, ASSIGNOR OF ONE-HALF TO WILLIAM H. CAVNAH, OF CANTON, OHIO.

SPRING SUPPORT.

Application filed June 26, 1924. Serial No. 722,504.

This invention relates to supports for the springs of beds, davenports, couches, chairs and similar upholstered pieces of furniture, and the objects of the invention are to provide a support of sheet metal reinforced by corrugations and adapted to be placed beneath the springs of a bed or the like, to raise or compress the central portion of the spring, preventing sagging of the same in the center under the weight of a person or persons lying thereon, whereby two persons may lie comfortably upon the bed without any tendency to roll together toward the center of the bed.

The above and other objects may be attained by constructing the device in the manner illustrated in the accompanying drawings, in which—

Figure 10:
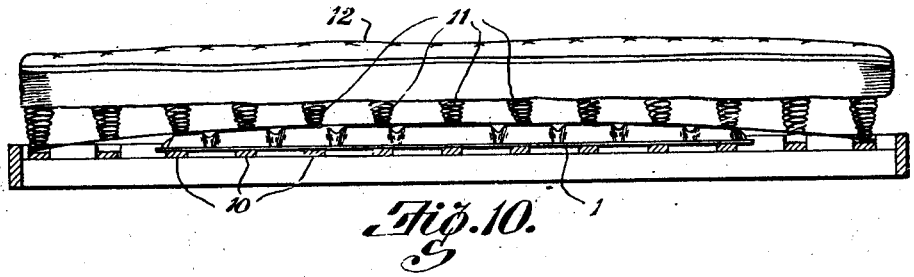
Figure 11:
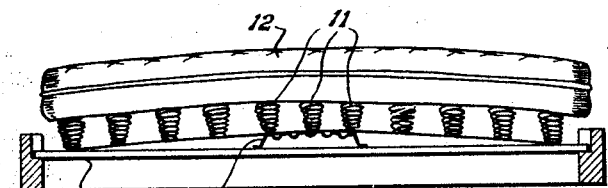
Figure 12:
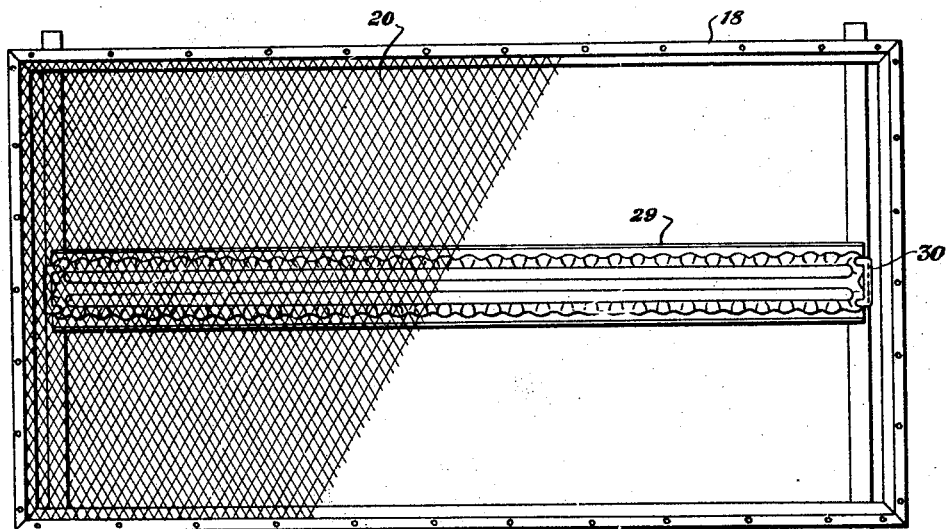

Figure 1 is a plan view of the sheet metal support;

Fig. 2, a fragmentary section on the line 2—2, Fig. 1;

Fig. 3, a transverse section on the line 3—3, Fig. 1, showing the auxiliary member illustrated in Fig. 4;

Fig. 5, a modified form of the invention, especially adaptable for wire mesh fabric springs;

Fig. 6, a transverse, sectional view through a sheet of metal stamped to form the device shown in Fig. 5;

Fig. 7, a section on the line 7—7, Fig. 5;

Fig. 8, one of the hook members adapted for connecting the support shown in Fig. 5 to the end rails of a bed;

Fig. 9, a plan view of the support as adapted for use in a chair bottom;

Fig. 10, a longitudinal, sectional view through a bed, provided with coil springs showing the invention applied thereto;

Fig. 11, a transverse sectional view through the form of the invention illustrated in Fig. 10;

Fig. 12, a plan view of the invention applied to a mesh fabric spring; and

Figure 13:
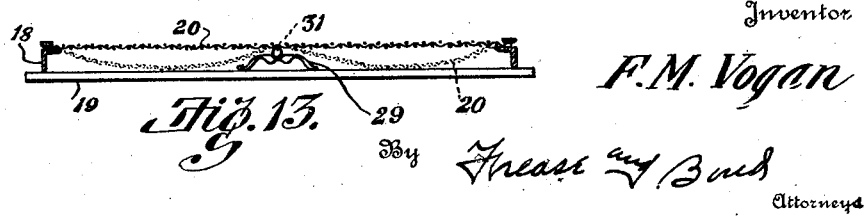

Fig. 13, a transverse sectional view of the same.

Similar numerals refer to similar parts throughout the drawings.

Referring first to the form of the invention illustrated in Figs. 1, 2, 3, 10 and 11, the support indicated generally at 1, is formed from a sheet of metal provided with the depending side edges 2 and end edges 3, which may be corrugated as at 4 to take up the stretch in the metal, the sheet terminating at its edges in the flat flange 5, preferably turned under as at 6 to provide a smooth edge.

As best shown in Figs. 2, 3, 10 and 11, the upper surface of this member is inclined downwardly toward each end from the center, and downwardly toward each side from the longitudinal center.

The support is provided at spaced intervals with transverse depressions 7, the central depressions being preferably spaced a slightly greater distance apart than those in the remainder of the support, as indicated at $7^a$.

Flat tables 8 are thus formed between each pair of transverse depressions, each of these tables being provided with the longitudinal depressions 9. The central table as shown at $8^a$, is of greater length than the remainder, and the depressions $9^a$ thereof are of greater length than the depressions 9, further stiffening the central portion of the support to prevent bending of the same.

In placing the support beneath the springs, as shown in Figs. 10 and 11, the support is placed upon the slats 10 of the bed beneath the longitudinal center of the spring, compressing the central coil springs 11 thereof and slightly raising the central portion of the mattress 12.

Where the springs are old and have lost considerable of their resiliency, the auxiliary strip 13, shown in Figs. 3 and 4, may be placed upon the top of the support 1 to further compress the central coils of the spring.

This auxiliary strip is formed from a sheet of metal having the central, raised rib 14 preferably inclined at its ends as shown at 15, spaced longitudinal depressions 16 being formed upon each side of the central rib to engage the depressions 9 of the support, thus preventing end or side movement of the strip 13 with reference thereto.

As shown in Fig. 3, this auxiliary strip when placed in position upon the support 1, considerably increases the height of the support through the longitudinal center thereof, the longitudinal rib 14 of the auxiliary strip being arranged to engage the central row of coils 11 of the spring to further compress the same.

If desired, strips of felt or the like, as shown at 17, may be placed upon the flat portions 8 of the support for engagement with the coils of the springs to prevent any unpleasant noise.

For use in davenports, divans, chairs and similar upholstered articles in which spring seats are provided, the support, as shown at 1, may be made in shorter lengths as shown in Fig. 9, the construction being otherwise the same.

The form of the invention shown in Figs. 5, 6, 7, 12 and 13, is best adapted for wire mesh fabric springs, which comprise generally a rectangular frame 18 arranged to rest upon a slat 19 near each end of the bed and covered with a wire mesh fabric 20.

This form of the invention is made from a single sheet, as best shown in Fig. 7, one longitudinal half of the sheet being convexed as shown at 21, and provided with the central longitudinal depression 22, centrally located within the flat portion 23 which is inclined downward toward each side, the curved corrugations 24 being provided along each side and end of the flat portion 23.

The other longitudinal side of the sheet is provided with the longitudinal corrugations 25 terminating in the flat flange portion 26. The sheet is then folded longitudinally along its center, bringing the corrugations 25 into engagement with the flat portion 23, the flange edge 26 being folded over the longitudinal edge 27, as indicated at 28, producing a strongly reinforced structure.

This support, indicated generally by the numeral 29, is placed upon the slats 19 as shown in Figs. 12 and 13, through the longitudinal center of the bed, and the hook members 30 are connected to each end of the support in any suitable manner and engage the outer edges of the slats.

If desired, a rubber tube or hose, as shown at 31, may be placed in the longitudinal recess 22 of the support to hold the central portion of the spring higher than the top of the support. In order to further reinforce the support, a pipe 32 may be located through the central corrugation 25.

When two persons occupy the bed reinforced with either form of support, it will be seen that the central portion of the spring and mattress will be held elevated, while the portions to each side of the center will be depressed, as best shown in dotted lines in Fig. 13, preventing the two persons from rolling together toward the center of the bed.

Although the support is shown as located through the longitudinal center of the bed, it should be understood that both forms of the support are movable and may be located toward each side of the bed, to accommodate differences in weight of persons occupying the bed.

For instance, it will be obvious that an extremely heavy person occupying one side of the bed would make it desirable to move the support toward that side of the bed, in order to maintain the mattress level.

As each form of the support is merely held in place by the weight of the mattress and springs thereon, it will be seen that this adjustment may be easily and readily made.

I claim:—

1. In combination with a bed having slats and a spring, a support for raising and compressing the longitudinal, central portion of the spring, said support resting upon the slats, engaging the longitudinal central portion of the spring and comprising a sheet metal strip having transverse and longitudinal corrugations.

2. In combination with a bed having slats and a spring, a support for raising and compressing the longitudinal, central portion of the spring, said support resting upon the slats, engaging the longitudinal central portion of the spring, and comprising a sheet metal strip having alternate transverse and longitudinal corrugations.

3. In combination with a bed having slats and a spring, a support for raising and compressing the longitudinal central portion of the spring, said support resting upon the slats, engaging the longitudinal central portion of the spring, and comprising a sheet metal strip having its upper surface inclined toward both ends.

4. In combination with a bed having slats and a spring, a support for raising and compressing the longitudinal, central portion of the spring, said support resting upon the slats, engaging the longitudinal central portion of the spring, and comprising a sheet metal strip having its upper surface inclined toward both sides.

5. In combination with a bed having slats and a spring, a support for raising and compressing the longitudinal, central portion of the spring, said support resting upon the slats, engaging the longitudinal central portion of the spring and comprising a sheet metal strip having its surface inclined toward both ends and toward both sides.

6. In combination with a bed having slats and a spring, a support for raising and compressing the longitudinal central portion of the spring, said support resting upon the slats, engaging the longitudinal central portion of the spring, and comprising a sheet metal strip having recesses formed in its upper surface and a separable part having portions for engaging said recesses.

In testimony that I claim the above, I have hereunto subscribed my name.

FRANK M. VOGAN.